May 12, 1936.  R. B. HITCHCOCK  2,040,692
SIDE DELIVERY HAY RAKE
Filed Feb. 11, 1935  2 Sheets-Sheet 1
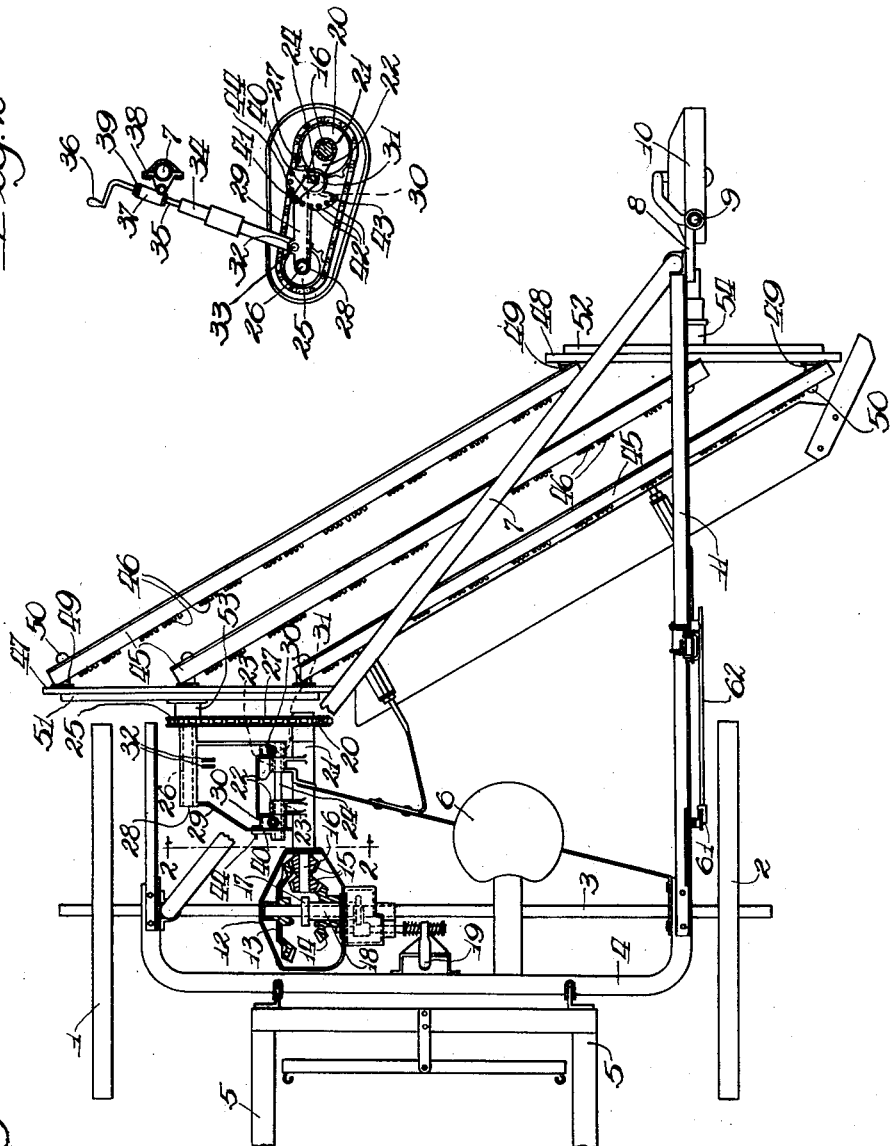
Inventor
Rex B. Hitchcock
By V. F. Lamague
Att'y.

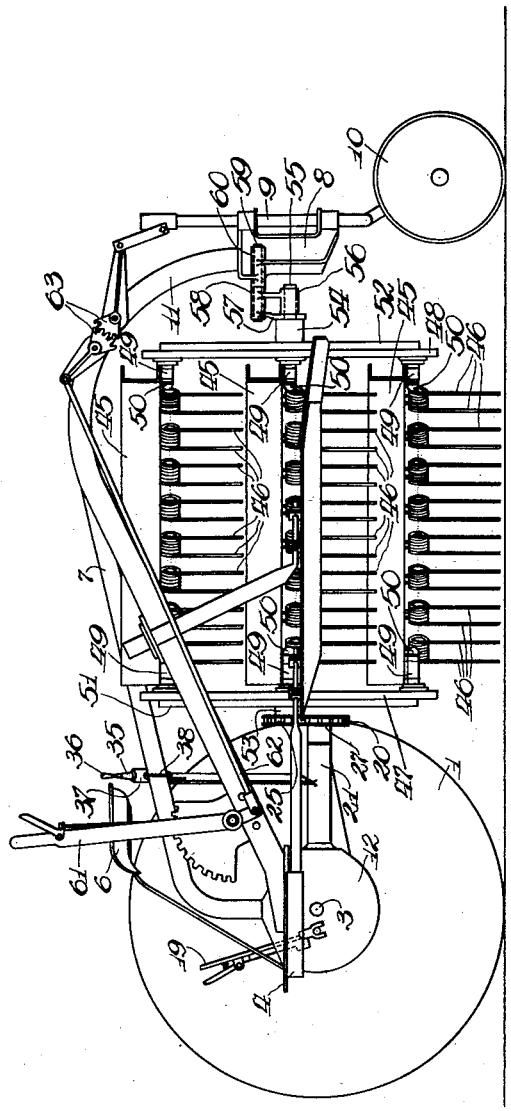

Patented May 12, 1936

2,040,692

UNITED STATES PATENT OFFICE 2,040,692

SIDE DELIVERY HAY RAKE

Rex B. Hitchcock, Marcq-en-Baroeul, France, assignor to International Harvester Company, a corporation of New Jersey Application February 11, 1935, Serial No. 5,972
In France May 14, 1934

9 Claims. (Cl. 56—377)

The present invention relates to side-delivery hay-rakes, swath-turners and tedders of the type wherein the rake-bars are equipped with pendent tines and are carried at their ends on revolving discs, spider members or the like which impart a combined rotary and to and fro movement to the bars and pendent tines across the path of the machine.

Such a side-delivery rake is convertible into a tedder by reversing the rotation of the rake-bars, at the same time engaging a higher speed.

In order to give the appropriate movement to the rake-bars it is known in rakes of this kind to rotate one of the supporting discs or other equivalent element employed (hereafter referred to as discs) that is, the one on which the so-called inner ends of the rake-bars are supported by means of a sprocket wheel and chain, the chain being driven by a further or primary sprocket wheel driven, in turn, over suitable gearing from the road-wheel axle. It is further known to provide means on the rake for adjusting the height of the rake-bars relative to the ground to adapt the rake for its different working requirements and for different crop conditions.

In order to provide for the adjustment of the inner ends of the rake-bars, the rake is usually equipped with a lever situated near the disc carrying the inner ends of the bars by means of which the disc itself may be raised and lowered in a vertical plane as desired, this movement, of course, raising and lowering in a like manner the ends of the rake-bars attached thereto.

The adjusting means heretofore provided for this purpose have not proved altogether satisfactory, inasmuch as they have been of rather a complicated nature due to the presence of the driving chain and the necessity of maintaining the chain at its proper tension for all positions of height adjustment of the rake-bars. Moreover, since the ends of the rake-bars are rotatably mounted on the supporting discs (in order to permit the tines always to hang downwardly as the discs revolve) it is important that the discs should maintain a fixed relation to each other when the rake-bars are adjusted in height, as otherwise the disc bearings or the rake-bar bearings may be strained or cramped, so that the rake will then work with difficulty and may cease to function altogether.

The object, therefore, of the present invention is to provide on such rakes a simplified mounting and arrangement of the shafts which support and procure the rotation of the discs or equivalent elements which carry the rake-bars, and of the lever by means of which the height adjustment of the inner ends of the rake-bars is effected, whereby this adjustment may be made in a simple manner and without causing cramping or straining of the disc bearings or of the ends of the rake-bars in their bearings, so that the discs and the bars carried by them will rotate easily for all positions of adjustment.

This object is achieved according to the invention by a construction and arrangement wherein the shaft carrying the secondary driving sprocket is carried in a bracket structure hingedly mounted by means of a horizontally disposed pivot on a fixed part of the frame structure of the rake, while the shaft of the disc on which the opposite or outer ends of the rake-bars are mounted is carried in a suspended link element which is swingably mounted on a portion of the fixed frame of the rake near the castor wheel situated at the so-called outer side of the rake. Furthermore the lever by means of which the height adjustment of the inner ends of the rake-bars is effected, is mounted on the bracket structure carrying the shaft of the secondary driving sprocket wheel and is arranged to move the structure up or down, this movement taking place around the hinged connection of the bracket structure to the fixed portion of the rake. The bracket structure mentioned includes means for varying the distance between the secondary sprocket wheel from the primary sprocket wheel, so as to afford means for adjusting the tension of the driving chain carried by the said sprocket wheels.

The invention is illustrated in the accompanying drawings in which:—

Figure 1 is a plan view of the complete rake but with certain parts omitted or broken away to disclose parts disposed underneath as will be explained hereafter;

Figure 2 is a view of a portion of the driving sprockets and their supports and also of the means provided for adjusting the tension of the chain, as seen along the line 2—2 of Figure 1 looking in the direction of the arrows; and Figure 3 is a side view of the complete rake looking on the so-called outer end remote from the driven end of the rake-bars, the near side wheel being omitted for the sake of clearness.

The road wheels indicated at 1, 2 are mounted on the ends of the main axle 3 and rotate the axle by means of the usual ratchet and pawl mechanism. The axle is carried in suitable bearings depending from the arms of the forward U shaped frame-bar 4 to which is also attached the pulling shafts 5 shown in Figure 1 and the support for the driver's seat 6. At one side of the frame-bar 4 one end of a pipe structure 7 is connected which extends transversely and rearwardly over the rake and at its opposite end it is bent downwardly and is secured on the side of a casting 8 forming the bearing for the spindle 9 of the castor wheel 10. At the other side of the frame bar 4 is connected one end of a rearwardly extending angle-iron bar 11 which, as seen in Figure 3, is formed as a curved bar with its rear end directed downwardly and secured on the casting 8 adjacent to the end of the pipe 7. The pipe 7 and bar 11 form the main supports for the raking element.

Suitably supported on the upstanding edge of the frame-bar 4 (which is conveniently formed as an angle iron) is a gear-box 12 which contains gears 13, 14 loosely carried on the main axle 3 and contains also two gears 15 keyed on the primary sprocket shaft 16. The gear-box 12 further contains a clutch member 17, formed on a sleeve 18 which rotates with the axle 3 but is slidable thereon by means of the clutch-lever 19 to permit the selective engagement of the clutch-member with either gear 13 or 14 to cause the rotation of the selected gear and therefore of the sprocket shaft 16 in one direction or another and at different speeds. The gear-box 12 is provided with a suitable cover (omitted in Figure 1) to enclose the gears.

In Figure 1 the pipe structure 7 is shown broken away in order to disclose the parts underneath. These parts will now be described.

At the free or rear end of the shaft 16 is keyed the primary or driving sprocket 20 and the shaft is carried in a bearing-sleeve 21 forming an extension of one side of the gear-box 12. The bearing sleeve is formed with projecting lugs 22 which are bored and are adapted to contain a pair of collars 23, one in each lug, mounted on the shaft 24 which is of square cross-section. The collars 23 are rotatable within the lugs 22.

The secondary or driven sprocket wheel is shown at 25 and it is mounted on the end of a short stub-shaft 26. This sprocket wheel is in alignment with the primary sprocket wheel 20 and the two are connected by the driving chain indicated at 27. The stub-shaft 26 is rotatably mounted in a bearing sleeve 28 formed integrally with a bracket structure 29 which, at the side remote from this bearing sleeve, is formed with a pair of ears 30. As may be seen in Figure 1 these ears 30 are disposed adjacent to the lugs 22 and they are bored through and are adapted to receive annular collars 31 eccentrically mounted on the square shaft 24 already referred to. The collars 31 are rotatably within the ears 30 for a purpose to be described later.

As shown especially in Figure 2, the upper side of the bracket structure 29 is formed with a pair of upstanding ears 32 which serve to receive a pin 33 for the pivotal attachment of the lower end of a pipe member 34 which is threaded internally and is adapted to receive the threaded end of the rod 35 formed with a cranked handle 36. The lever rod 35 is loosely supported in a sleeve 37 connected in any convenient manner to a part of the fixed frame of the rake, such as by the clamp or bracket shown at 38. The rod 35 of the lever is further formed with annular enlargements 39 to prevent it moving axially in the sleeve 37.

It will be understood, therefore, that by turning the handle 36 of the lever, the threaded end of the rod 35 will be screwed in or out of the pipe 34, so raising or lowering the whole bracket structure 29 and the parts associated with it. This movement of the bracket will take place around the hinged connection of the bracket on the bearing sleeve because the collars 23 are rotatable in the lugs 22 formed on the bearing sleeve 21.

In Figure 1 the lever handle 36 and the associated parts have been omitted so as not to obscure the other parts described above, this figure shows only the ears 32 to which the lower end of the pipe 34 is connected.

At one end of the square shaft 24 a short lever arm 40 is provided, terminating at its other end in an eye 41 which is adapted to be brought into register with any one of a series of holes 42 arranged in an arc on a plate 43 formed as an enlargement of one side of the bracket structure 29. A pin or bolt 44 is inserted in the eye 41 and one of the holes 42 to secure the lever arm at a particular position relative to the plate 43. If the pin or bolt 44 is removed, the arm 40 may be rotated and the eye 41 brought into register with any one of the holes 42 as desired and the arm may then be secured at this position by reinserting the pin or bolt.

The rotation of the lever arm 40 in the manner described causes the partial rotation of the square shaft 24 and also the partial rotation of the collars 31 eccentrically mounted on the shaft. The eccentric movement of the collars 31 in the eyes 30 will cause the movement of the whole bracket structure 29 away from or towards the bearing sleeve 21, according to the direction of the rotation of the arm 40, with the result that the secondary sprocket wheel 25 carried on the shaft 26 will be moved away from or towards the primary sprocket wheel 20 so affording means to adjust the tension of the chain 27 trained around the sprockets.

The rake-bars 45 which carry the pendent tines 46 are mounted around the edges of a pair of discs 47, 48 which are disposed parallel to one another. The ends of the rake-bars are provided with suitable bearings indicated at 49 which are journaled on pins 50 (see Figure 1) projecting from the discs. The discs themselves are mounted on the usual cross-arm or spider-arm structures 51, 52 of which the centre junction point of the arms are formed with sleeves 53, 54. The sleeve 53 on the disc 47 which supports the inner ends of the rake-bars is secured to, or is formed with, the secondary sprocket wheel 25 which, as mentioned above, is carried on the stub-shaft 26. The sleeve 54 at the opposite or outer end of the rake-bars is keyed to a stub-shaft 55 rotatably carried in a bearing sleeve 56 formed at the lower end of a link member 57. The upper end of this link 57 is similarly formed with a sleeve 58 loosely carried on a pin 59 secured in a further sleeve 60 forming part of the casting 8 which as already mentioned, serves to carry the bearings for the spindle 9 of the castor wheel 10.

From the above description it will be clear that the rotation of the sprocket 25 will effect also the rotation of the disc 47 attached thereto and consequently also of the rake-bars 45 and the outer disc 48. The shaft 55 of the outer disc 48 rotates in the bearing sleeve 56 and the link 57 carrying the sleeve is free to swing on the pin 59.

A lever 61 is provided near the driver's seat by means of which the height of the outer end of the rake bars may be adjusted in a known manner. The linkage between lever 61 and the spindle 9 of the castor-wheel is indicated at 62, 63.

The function and operation of the parts described will now be briefly explained.

The rotation of the main axle 3 by the road-wheels effects the rotation of the clutch element 17 associated with the gears and, according to the use of the rake as desired for the time being, that is either for tedding or raking and swath-turning, the clutch element is engaged with either gear 13 or 14 by means of the clutch lever 19, to procure the rotation of the primary sprocket wheel 20. This sprocket wheel is driven either in one direction or the other and at different speeds depending upon the particular gear in engagement with the clutch-member 17.

The sprocket wheel 20 drives the secondary sprocket wheel 25 by means of the chain 27, so driving also the disc 47, the rake-bars 45 and the outer disc 48, which causes the well-known combined rotary and to and fro movement of the tines 46 across the path of the machine.

In order to adapt the rake for the different working and crop conditions found in practice, it is necessary to adjust the rake-bars at different heights above the ground. This adjustment is accomplished by a height adjustment of the discs on which the rake-bars are supported. In the rake herein described, when it is desired to adjust the height of the inner disc 47, the lever handle 36 is given a few turns so raising or lowering the bracket structure 29. The movement of the bracket 29 takes place at its hinged connection on the bearing sleeve 21 because, as already described, the collars 23 are rotatable in the lugs 22. Therefore the bearing sleeve 28 at the opposite end of the bracket which carries the shaft 26 of the secondary sprocket wheel 25 and the inner disc 47 move in an arcuate path with the square shaft 24 as a center.

If, now, the opposite or outer disc 48 were fixedly attached to the casting 8, cramping of the bearings of the disc or of the rake-bars carried on the discs would ensue when the adjustment of the inner disc 47 were made. According to this invention, however, the shaft 55 of the outer disc 48 is not fixedly attached to the said casting, but is swingably mounted thereon by means of the swinging link 57. Thus, when the shaft 26 moves in the path described due to the height adjustment of the inner end of the rake-bars, the shaft 55 moves in a like manner so that the discs maintain a constant relation to each other and no cramping or straining of the bearings will be caused.

If the height of the inner end of the rake-bars is altered to an extent such as to cause the bars to be substantially out of level relative to the ground, the bars may be brought level by an adjustment of the casting 8 on the spindle 9 of the castor wheel by means of the lever 61 in known manner.

The chain 27 may be kept at the proper tension by means of the eccentric adjusting means 40, 42, 43 already referred to.

It will now be seen that an improved rake adjustment structure has been provided which achieves the desirable objects heretofore recited. It is to be understood, of course, that the form herein shown represents only one practicable embodiment of the invention and that in practice it may assume other forms.

The intention is to cover all such changes and modifications which do not in material respects depart from the spirit and scope of the invention as hereinafter claimed.

What is claimed is:

1. In a side delivery rake, a wheel carried main frame and axle, gearing driven by the axle including a longitudinal drive shaft having a primary sprocket wheel fast thereon, a bracket pivotally associated with said shaft, a parallel stub shaft carried by the bracket including a secondary sprocket wheel driven from the primary sprocket wheel, a rake cylinder disposed diagonally of the line of travel and having an inner end member carried by the stub shaft and driven by said secondary sprocket wheel, means to adjust the bracket and inner end of the cylinder up or down, an outer end member for the cylinder parallel with the inner end member, and means whereby the outer end member moves in parallel with the inner end member when the latter is adjusted.

2. In a side delivery rake, a wheel carried main frame and axle, a shaft driven from the axle, a bracket associated with the shaft for movement about a horizontal axis, a raking cylinder disposed diagonally of the line of draft and having an inner end member adjustably carried by said bracket, an outer end member for the cylinder disposed parallel with the inner end member, a swingable member associated with the frame carrying the outer end member, and means to swing the bracket to adjust the raking cylinder, both ends of the cylinder being thereby moved together with the end members remaining substantially in their parallel relationship.

3. In a side delivery rake, a wheel carried main frame and axle, a shaft driven from the axle, a bracket associated with the shaft for movement about a horizontal axis, a raking cylinder disposed diagonally of the line of draft and having an inner end member adjustably carried by said bracket, an outer end member for the cylinder disposed parallel with the inner end member, a swingable member associated with the frame carrying the outer end member, a lever carried by a fixed part of the main frame and having connection with the bracket whereby to swing the latter about its horizontal axis to adjust the raking cylinder, both ends of the cylinder being thereby moved together with the end members remaining substantially in their parallel relationship.

4. In a side delivery rake, a wheel carried main frame and axle, a gear box associated with the axle including a horizontal bearing extending therefrom and carrying a shaft driven by gearing located in the box, a bracket pivotally associated with the bearing, said bracket carrying a stub-shaft driven from the first shaft, a rake cylinder having an inner end member carried by and driven from the stub shaft, said cylinder having an outer end member swingably associated with the frame, and means to swing the bracket to adjust the cylinder.

5. In a side delivery rake, a wheel carried main frame and axle, a gear box associated with the axle including a horizontal bearing extending therefrom and carrying a shaft driven by gearing located in the box, a bracket pivotally associated with the bearing, sprocket wheels on the shafts including a chain for driving the stub shaft from the first shaft, a rake cylinder having an inner end member carried by and driven from the stub shaft, said cylinder having an outer end member swingably associated with the frame, means to swing the bracket to adjust the cylinder, and means to maintain the drive chain properly tensioned in all positions of adjustment of the cylinder.

6. In a side delivery rake, a transverse wheel carried axle, a rearwardly extending frame carried by the axle, a gear box enclosing gearing driven from the axle, said box journaling a longitudinal shaft extending rearwardly of the axle, a bracket swingably associated with the shaft and carrying at its free end a second longitudinal shaft, means for driving the second shaft from the first shaft, a front rake head disposed in a vertical transverse plane and carried for rotation by said second shaft, rake cylinder bars disposed diagonally and rearwardly with their front ends carried by the front rake head, the frame having its rear end carried on a wheel structure including a longitudinal stub shaft, said stub shaft swingably mounting a bracket, and means carried by said latter bracket for rotatably supporting a rear rake head to which the bars are connected at their rear ends, said rear rake head being disposed in substantial parallelism with the front rake head.

7. In a side delivery rake, a transverse wheel carried axle, a frame carried by the axle, a longitudinal shaft extending rearwardly of the axle and geared thereto to be driven therefrom, a transversely disposed bracket swingably associated with the shaft and carrying at its free end a second longitudinal shaft, means for driving the second shaft from the first shaft, a front rake head disposed in a vertical transverse plane and carried for rotation by said second shaft, rake cylinder bars disposed diagonally and rearwardly with their front ends carried by the front rake head, the frame having its rear end carried on a wheel structure including a longitudinal stub shaft, said stub shaft swingably mounting a transversely disposed bracket, and means carried by said latter bracket for rotatably supporting a rear rake head to which the bars are connected at their rear ends, said rear rake head being disposed in substantial parallelism with the front rake head.

8. In a side delivery rake, a transverse wheel carried axle, a frame carried by the axle, a longitudinal shaft extending rearwardly of the axle and geared thereto to be driven therefrom, a transversely disposed bracket swingably associated with the shaft and carrying at its free end a second longitudinal shaft, means for driving the second shaft from the first shaft, a front rake head disposed in a vertical transverse plane and carried for rotation by said second shaft, rake cylinder bars disposed diagonally and rearwardly with their front ends carried by the front rake head, the frame having its rear end carried on a wheel structure including a longitudinal stub shaft, said stub shaft swingably mounting a transversely disposed bracket, means carried by said latter bracket for rotatably supporting a rear rake head to which the bars are connected at their rear ends, said rear rake head being disposed in substantial parallelism with the front rake head, and means for swinging the first mentioned bracket to raise or lower the rake heads and bars.

9. In a side delivery rake, a transverse wheel carried axle, a frame carried by the axle, a longitudinal shaft extending rearwardly of the axle and geared thereto to be driven therefrom, a bracket swingably associated with the shaft and carrying at its free end a second longitudinal shaft, chain gearing for driving the second shaft from the first shaft, a front rake head disposed in a vertical transverse plane and carried for rotation by said second shaft, rake cylinder bars disposed diagonally and rearwardly with their front ends carried by the front rake head, the frame having its rear end carried on a wheel structure including a longitudinal stub shaft, said stub shaft swingably mounting a bracket, means carried by said latter bracket for rotatably supporting a rear rake head to which the bars are connected at their rear ends, said rear rake head being disposed in parallelism with the front rake head, and means for simultaneously and equally adjusting both rake heads up or down.

REX B. HITCHCOCK.